United States Patent [19]

Askienazy et al.

[11] Patent Number: 5,936,005
[45] Date of Patent: Aug. 10, 1999

[54] CROSSLINKABLE COMPOSITION FOR COATING SUBSTRATES, COATING PROCESS EMPLOYING THIS COMPOSITION, AND SUBSTRATES THUS COATED

[75] Inventors: Anne Askienazy, Aspieres; Rob Zwanenburg, Verneuil en Halatte, both of France

[73] Assignee: Cray Valley S.A., France

[21] Appl. No.: 08/860,267

[22] PCT Filed: Dec. 18, 1995

[86] PCT No.: PCT/FR95/01689

§ 371 Date: Jun. 19, 1997

§ 102(e) Date: Jun. 19, 1997

[87] PCT Pub. No.: WO96/19510

PCT Pub. Date: Jun. 27, 1996

[30] Foreign Application Priority Data

Dec. 19, 1994 [FR] France .................................. 94 15373
Dec. 19, 1994 [FR] France .................................. 94 15373

[51] Int. Cl.⁶ ...................................... C08F 2/46
[52] U.S. Cl. .......................... 522/120; 522/121; 427/487; 526/271; 525/297; 525/303; 527/311
[58] Field of Search .................................. 522/121, 120; 528/297, 303; 527/311; 526/271

[56] References Cited

U.S. PATENT DOCUMENTS

| | | | |
|---|---|---|---|
| 3,887,450 | 6/1975 | Gilano et al. | 204/159.15 |
| 4,722,947 | 2/1988 | Thanawalla et al. | 522/120 |
| 5,087,552 | 2/1992 | Hroigome et al. | 430/280 |
| 5,114,830 | 5/1992 | Suber | 430/280 |
| 5,124,234 | 6/1992 | Wakata et al. | 430/280 |
| 5,296,334 | 3/1994 | Castaldi et al. | 430/280 |

FOREIGN PATENT DOCUMENTS

| | | |
|---|---|---|
| 0346486 | 12/1989 | European Pat. Off. . |
| 0366333 | 5/1990 | European Pat. Off. . |

Primary Examiner—James J. Seidleck
Assistant Examiner—Sanz McClendon
Attorney, Agent, or Firm—Schnader, Harrison, Segal & Lewis

[57] ABSTRACT

A curable composition comprising (A) a modified copolymer which is a partial ester of a styrene-carboxylic anhydride copolymer, a hydroxyalkyl (meth)acrylate and, if required, a monovalent alcohol; (B) at least one diluent for the modified copolymer; (C) at least one multifunctional epoxy; and (D) a photoinitiator or a system capable of initiating photopolymerisation; and being characterised in that it further includes (E) at least one catalyst for the reaction between carboxylic acid functions and epoxy functions. The composition is useful for coating substrates by heat and radiation curing.

20 Claims, No Drawings

CROSSLINKABLE COMPOSITION FOR COATING SUBSTRATES, COATING PROCESS EMPLOYING THIS COMPOSITION, AND SUBSTRATES THUS COATED

The present invention relates to a crosslinkable composition which can be applied for coating substrates, and to a coating process employing this composition and to the corresponding coated substrates.

The substrates in question are substrates of all kinds, both porous, like wood, and nonporous, like glass, metals or plastics, and both planar in shape and comprising relief or hollow regions or, more generally, of complex shapes giving rise to regions, called shadow regions, which cannot be reached by irradiation using UV lamps or electron beams under which the components to be coated are travelling. This is, for example, the case with wood exhibiting pores which open at the surface or complex mechanical items like engine components.

The technical requirements of the protective varnishes and coatings addressed by the present invention are very diverse and sometimes highly restrictive; they are generally the following:

excellent adhesion to metals such as aluminium and steel and to plastics such as polycarbonate;

excellent mechanical properties, in particular of flexibility, modulus and tensile strength;

very good substrate wetting properties;

good dispersibility of organic and inorganic pigments;

good adhesion as interface layer;

excellent adhesion to substrates with shadow regions, in particular porous substrates such as wood, and obtaining a complete crosslinking, it being known that, in the contrary case and with porous substrates, the remaining monomers can exude to the surface of the coating in the course of time, in particular with the disadvantage of producing an unpleasant odour;

excellent adhesion to all types of substrates of complex shapes, even in the shadow regions.

Until now a high level of these requirements has never been satisfied simply, economically and with respect for the environment and, in particular, on coatings applied to substrates comprising shadow regions, a hard-ness of the portion of the coating of the shadow region has not been obtained, it being possible, as indicated, for this shadow region to comprise thick regions in which the crosslinking under the effect of an irradiation is found to be difficult.

Patent Application JP-A-62/158710 discloses a photocrosslinkable composition which can be used especially for the manufacture of inks, including:

(a) 100 parts by weight of a mixture consisting of
  (1) 40 to 80% by weight of a modified copolymer obtained by ring opening of 10 to 100% of the anhydride rings of a maleic anhydride-unsaturated hydrocarbon copolymer using a hydroxyalkylene (meth)acrylate; and
  (2) 20 to 60% by weight of a modified copolymer prepared by ring opening of 50 to 100% of the anhydride rings of a maleic anhydride-unsaturated hydrocarbon copolymer using a saturated compound containing a hydroxyl group;
(b) from 5 to 40 parts by weight of a resin obtained by ring opening of 0 to 70% of the epoxy rings of an epoxidized phenolic resin using (meth)acrylic acid;
(c) from 5 to 100 parts by weight of photopolymerizable monomers; and
(d) from 0.5 to 15 parts by weight of photoinitiators.

Patent Application JP-A-63/205649 discloses a photosensitive liquid composition which can be used as a soldering mask for printed circuits, including:

100 parts by weight of the mixture of an ester (a) obtained by reaction of a copolymer formed by at least 10 mol % of maleic anhydride and at most 90 mol % of monomer which is polymerizable by a radical route with 0.05 to 0.95 moles, per mole of anhydride, of alcohol and/or of monovalent epoxide which can be polymerized by a radical route and of an epoxide (b) chosen from bisphenol diglycidyl ether and epoxy resins of cresol-novolac or phenol-novolac type;

from 10 to 200 parts by weight of a compound which can be polymerized by a radical route, containing no epoxy group; and an organic solvent.

Hydroxyalkyl (meth)acrylates are mentioned among the monovalent alcohols which can form part of the composition of the ester (a). Glycidyl (meth)acrylate, allyl glycidyl ether and cyclohexenevinyl monoepoxide are mentioned among the monovalent epoxides which can form part of the composition of the ester (a).

Already known from Patent U.S. Pat. No. 5,114,830 is a composition, crosslinkable under the effect of a radiation, including from 15 to 40% by weight of a partial ester of a hydroxyalkyl (meth)acrylate and of a styrene-maleic anhydride copolymer, from 2 to 15% of a multi-functional (meth)acrylate monomer, from 3 to 12% of a photoinitiator and from 10 to 35% by weight of a multi-functional epoxide. This composition, intended for crosslinked soldering masks for printed circuits, makes it possible to solve the technical problems previously attributed to the postcuring (thermal crosslinking) stage which follows the crosslinking using irradiation. In fact, during the curing stage (at a temperature of 130° to 170° C.), a substantial proportion of the hydroxyalkyl (meth)acrylate groups dissociates from the polymer, thus regenerating maleic anhydride groups which can react with the multifunctional epoxide to perform a new and more stable crosslinking of the photopolymer. In all probability this involves the formation of an interpenetrating network of, on the one hand, poly(meth)acrylate and, on the other hand, of epoxide-grafted styrene-maleic anhydride copolymer.

Patent U.S. Pat. No. 5,296,334 discloses a photocrosslinkable composition including (a) 5 to 50% by weight of an esterified styrene-maleic anhydride copolymer which has less than 15% of free anhydride, in which at least 50% of the anhydride groups are esterified with a hydroxyalkyl (meth) acrylate and at least 0.1% of the anhydride groups are esterified with a monovalent alcohol, (b) 5 to 20% by weight of a multifunctional (meth)acrylate monomer, (c) 1 to 30% by weight of a multifunctional epoxide and (d) 1 to 15% by weight of a photoinitiator. This composition provides a soldering mask for printed circuits after a precure at a temperature of 49° to 77° C., followed by an exposure to high-energy radiation, followed by a postcure at a temperature of 121° to 160° C. for 5 minutes to 2 hours. In this technology the exposure to radiation results in a reaction between the (meth)acrylate groups of the copolymer (a) and the (meth)acrylate groups of the monomer (b).

It has now been found that, by reacting in a different manner the ingredients of the compositions of Patents U.S. Pat. Nos. 5,114,830 and 5,296,334 with, in addition, an appropriate catalyst, it is possible to form protective varnishes and coatings which can be employed on a wide variety of substrates in applications in which the technical requirements, indicated above, are different from those (heat resistance, chemical resistance to solvents and to the acids employed in soldering, adhesion to copper, stability in high humidity conditions) of the soldering masks for printed circuits.

A first subject of the present invention consists of a crosslinkable composition including:

(A) a modified copolymer which is a partial ester of a styrene-carboxylic anhydride copolymer, of a hydroxyalkyl (meth)acrylate and, where appropriate, of a monovalent alcohol;

(B) at least one diluent for the said modified copolymer;

(C) at least one multifunctional epoxide;

(D) a photoinitiator or a system capable of initiating photopolymerization, characterized in that it additionally includes:

(E) at least one catalyst of the reaction between carboxylic acid functional groups and epoxy functional groups.

(A) Modified Copolymer

The styrene-carboxylic anhydride base copolymer which can be used for forming the component (A) of the crosslinkable composition according to the invention has, preferably, a number-average molecular weight of approximately between 500 and 4000; it is generally of the alternating type and it preferably has a molar ratio of styrene to the carboxylic anhydride of approximately between 1 and 4.

Examples of unsaturated carboxylic anhydrides forming part of the composition of the styrene-carboxylic acid base copolymer which may be mentioned are the anhydrides of maleic, itaconic and citraconic acids, in particular maleic anhydride.

The hydroxyalkyl (meth) acrylate which can be used for modifying the styrene-carboxylic anhydride base copolymer is, preferably, an acrylate or methacrylate in which the hydrocarbon part of the hydroxyalkyl group has approximately from 2 to 12 carbon atoms, such as the hydroxyethyl, hydroxypropyl, hydroxybutyl or tetrapropylene glycol (meth)acrylate.

As examples of monovalent alcohols which can, where appropriate, be used for modifying the styrene-carboxylic anhydride base copolymer there may be mentioned short-chain (from 1 to 6 carbon atoms) aliphatic alcohols such as methanol, ethanol, propanol, butanol and 1-methoxy-2-propanol, and long-chain (approximately 7 to 22 carbon atoms) aliphatic alcohols, such as stearyl alcohol.

For good effectiveness of the crosslinkable compositions according to the invention it is preferable that the molar ratio of the hydroxyalkyl (meth)acrylate to the carboxylic anhydride functional groups present in the styrene-carboxylic anhydride copolymer should not exceed 1.

(B) Diluent for the Modified Copolymer

The diluent for the modified copolymer present in the crosslinkable composition according to the invention may be either an unreactive diluent of the light alcohol type (like methoxypropanol) or else a saturated ester (like butyl acetate), or a reactive diluent such as a multifunctional (meth)acrylate, and more particularly a polyol poly(meth)acrylate, like ethylene glycol, propylene glycol, 1,3-butanediol, 1,4-butanediol, 1,6-hexanediol, neopentyl glycol, 1,4-cyclohexanediol, 1,4-cyclohexanedimethanol, 2,2,4-trimethyl-1,3-pentanediol, 2-ethyl-2-methyl-1,3-propanediol, 2,2-diethyl-1,3-propanediol, diethylene glycol, dipropylene glycol, triethylene glycol, tripropylene glycol, tetraethylene glycol, tetrapropylene glycol, trimethylolethane, trimethylolpropane, glycerol and pentaerythritol diacrylates and dimethacrylates, trimethylolethane, trimethylolpropane, glycerol and pentaerythritol triacrylates and trimethacrylates, pentaerythritol tetraacrylates and tetramethacrylates, dipentaerythritol di(meth)acrylates to hexa(meth)acrylates, poly(meth)acrylates of mono- or polyethoxylated or mono- or polypropoxylated polyols, such as triethoxylated trimethylolpropane and tripropoxylated trimethylolpropane triacrylate and trimethacrylate, tripropoxylated glycerol triacrylate and trimethacrylate, tetraethoxylated pentaerythritol triacrylate, trimethacrylate, tetraacrylate and tetramethacrylate, and mixtures thereof in any proportions. Among these, preference is given to those which have the effect of lowering the viscosity of the composition, such as especially ethoxylated trimethylolpropane triacrylate and polyethylene glycol diacrylates.

The proportion of diluent in the crosslinkable composition according to the invention is approximately between 5% and 200% by weight, preferably approximately between 25 and 100% by weight, relative to the sum of the components (A)+(C), according to the viscosity desired for the final composition and the nature of the diluent and of the multifunctional epoxide which are employed.

(C) Multifunctional Epoxide

The multifunctional epoxide employed in the crosslinkable composition according to the invention has at least two epoxy functional groups. More particularly it is possible to mention diepoxidized resins:

of cycloaliphatic type like, for example, those containing a cyclohexene, tricyclodecene or cyclopentene oxide group, 3,4-epoxycyclohexylmethyl-3', 4'-epoxycyclohexane, 3,4-epoxycyclohexylmethyl 3,4-epoxycyclohexanecarboxylate, vinylcyclohexene dioxide, 2,2-bis(3,4-epoxycyclohexyl)propane, bis-(2,3-epoxycyclopentyl) ether, 2-(3,4-epoxy)cyclohexane-5,5-spiro(3,4-epoxy)cyclohexane-m-dioxane and bis(3,4-epoxy-6-methylcyclohexyl) adipate;

of aliphatic type like, for example, butadiene diepoxide and diepoxides of polyglycols of general formula:

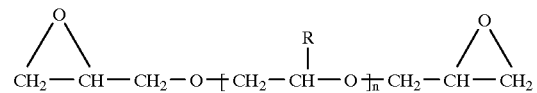

in which R is chosen from the hydrogen atom and the methyl radical and n is an integer ranging approximately from 1 to 15; and of aromatic type like, for example, bisphenol A diglycidyl ether, bisphenol F diglycidyl ether and ethoxylated bisphenol A diglycidyl ether.

To make use of the invention it is also possible to employ aliphatic triepoxidized resins like, for example, glycerol triglycidyl ether and trimethylolpropane triglycidyl ether and tetraepoxidized resins like, for example, tetraglycidylbisaminomethylcyclohexane, and multiepoxidized resins like, for example, epoxy novolacs.

For good effectiveness of the crosslinkable composition according to the invention it is preferable that the molar ratio of the carboxylic acid functional groups of the modified, that is to say partially esterified, copolymer (A) to the epoxy functional groups of the multifunctional epoxide (C) should be between 0.3 and 2.

(D) Photoinitiator or System Capable of Initiating the Photopolymerization

The photoinitiator employed in the crosslinkable composition according to the invention may be any compound capable of generating free radicals under the effect of ultraviolet radiation.

Examples which may be mentioned are:

α-diketones like benzil and diacetyl;

acyloins like benzoin;

acyloin ethers like benzoin methyl ether, benzoin ethyl ether, benzoin isopropyl ether and benzoin isobutyl ether;

thioxanthones like thioxanthone, 2,4-diethyl-thioxanthone, thioxanthone-1-sulphonic or isopropylthioxanthone-4-sulphonic acid, isopropylthioxanthone and 2-chlorothioxanthone;

benzophenones like benzophenone, 4,4-bis (dimethylamino)benzophenone, 4,4'-bis(diethylamino) benzophenone or 4,4'-diethylaminobenzophenone, Michler's ketone;

propiophenones like 2-hydroxy-2-methylpropiophenone or 4'-isopropyl-2-hydroxy-2-methylpropiophenone;

acetophenones like acetophenone, p-dimethylaminoacetophenone, α,α'-dimethoxyacetoxy-acetophenone, 2,2-dimethoxy-2-phenylacetophenone, p-methoxyacetophenone, 2-methyl-[4-(methylthio) phenyl]-2-morpholino-1-propanone, 2,2-diethoxy-acetophenone, 4'-phenoxy-2,2-dichloroacetophenone, 2-benzyl-2-N,N-dimethylamino-1-(4-morpholinophenyl)-1-butanone, 2,2-dimethoxy-2-phenylacetophenone or 2-hydroxy-2-methyl-1-phenylpropanone;

quinones like anthraquinone, 2-ethylanthraquinone, 2-chloroanthraquinone or 1,4-naphthoquinone;

alpha-hydroxyaryl ketones like 1-hydroxycyclohexyl phenyl ketone;

halogenated compounds like phenacyl chloride, tribromomethyl phenyl sulphone or tris(trichloromethyl)-s-triazine;

peroxides like di-t-butyl peroxide; and other compounds, like benzil dimethyl ketal, isoamyl N,N-dimethylaminobenzoate, ethyl N,N-dimethylaminobenzoate, benzoin benzoate, 2-hydroxy-2-methyl-1-phenylpropanone or α-acyloxime ester.

These compounds can be employed either individually as a photoinitiator or in the form of a mixture of at least two of them, as a photoinitiating system. Furthermore, at least one photoactivating agent may be associated with the intitiator or the photoinitiating system.

The proportion of photoinitiator or of photoinitiating system in the crosslinkable composition according to the invention is, for example, approximately between 2 and 15%, preferably approximately between 3 and 9%, relative to the weight of the sum of the components (A)+(C).

(E) Catalyst According to the Invention

The catalyst of the reaction between the carboxylic acid functional groups of the modified copolymer and the epoxy functional groups of the multifunctional epoxide may be chosen especially from tertiary amines, betaines, organic onium acetates, triphenylphosphite chromium acetate and quaternary salts of tertiary amines.

The proportion of the catalyst in the crosslinkable composition according to the invention is, for example, approximately between 1 and 10% by weight, preferably approximately between 1.5 and 7% by weight, relative to the sum of the components (A)+(C).

Other Additives

The crosslinkable composition according to the invention may additionally include, with a view to certain specific applications, additives such as:

inorganic pigments like titanium dioxide, iron oxides, carbon black, or organic ones like copper phthalocyanine blue, β-naphthol red, azo yellows and dioxazine violet, it being possible for these pigments to be employed in a proportion of 0.5 to 40% by weight relative to the sum of the components (A)+(C);

polymer waxes, which can be employed in a proportion of 0.5 to 10% by weight relative to the sum of the components (A)+(C);

pulverulent inorganic fillers such as talc, silica or calcium carbonate, it being possible for these fillers to be employed in a proportion of 2 to 40% by weight relative to the sum of the components (A)+(C).

The crosslinkable compositions according to the invention can be used for being deposited as a layer on the surface of a substrate and for being made to crosslink in order to protect the said substrate against, for example, oxidation and/or moisture, scratching, or else for decorative purposes.

The crosslinking of the compositions according to the invention is a double crosslinking:

1) by a radical route, of the copolymer (A) with itself or with the diluent (B) if the latter is reactive in the presence of the photoinitiator or photoinitiating system (D); and 2) by reaction of the carboxylic acid groups of the copolymer (A) with the epoxy groups of the component (C) in the presence of the catalyst (E).

The crosslinking 1) must be performed by irradiation.

The originality of the present invention is that, in order to ensure the crosslinking 2), by virtue of the presence of the catalyst (D), it is possible to carry on as far as doing without heating, with the result that there is no dissociation of the alkyl (meth)acrylate from the styrene-carboxylic anhydride copolymer, or else heating conditions (temperature, duration) can be provided such that there is also no dissociation of the alkyl (meth)acrylate from the styrene-carboxylic anhydride copolymer, in contrast to the compositions according to U.S. Pat. No. 5,296,334 and EP-0 366 333. Since the hydroxyalkyl (meth)acrylate groups have not dissociated from the styrene-carboxylic anhydride copolymer, the latter therefore carries its carboxylic acid groups as the only ones available for a reaction with the multi-functional epoxide. In these conditions a single polymer network will always be formed, ensuring the hardness sought after for the applications of the invention.

Thus, a second subject of the present invention consists of a process for coating substrates, consisting in applying onto a substrate a layer of the crosslinkable composition described above and then, where appropriate, in subjecting the coated substrate to a stage of thermal crosslinking and in subsequently subjecting it to a stage of crosslinking by irradiation.

A large number of porous and nonporous substrates may be mentioned as substrates that can be subjected to the process of coating according to the invention, such as especially:

metals like iron, steel, special steels, zinc, aluminium, and the like;

plastics and synthetic resins such as polyolefins, polycarbonate, polystyrene, polyethylene terephthalate, poly(vinyl chloride) and acrylonitrile-butadiene-styrene resins;

natural materials such as wood and rubber, and synthetic materials such as melamine-formaldehyde resin laminates, agglomerates and the like.

Within the scope of the process according to the invention the layer of crosslinkable composition is applied in the form of a thin-to-semithick coating ranging from a thickness of 2 µm to approximately 5 mm. The application of the crosslinkable composition onto the substrate can be performed by any known method such as a gun, roll, curtain and the like.

The optional thermal crosslinking stage is performed, for example, at a temperature of 80° to 150° C., preferably 90° to 120° C., for a period of at least 15 seconds and in most cases not exceeding approximately 10 minutes, this period being proportionately longer the lower the temperature and the smaller the proportion of the catalyst (E) present. Thermal crosslinking can be performed, in a manner known per se, in a convection oven or else in an infrared oven.

Finally, in the stage of crosslinking using irradiation, which is known per se, any source of high-energy radiation can be employed, such as, for example, the electron beam or else ultraviolet radiation as obtained, for example, by means of a mercury lamp.

In the case where a crosslinking is conducted by providing a heating stage preceding the irradiation stage, a crosslinked composition is obtained, characterized in that it includes a single network formed throughout the thickness of the said coating by the partially esterified styrene-carboxylic anhydride copolymer (A) which, in the network, has been maintained without dissociation of its hydroxyalkyl (meth)acrylate groups and has had its carboxylic acid groups which have reacted with the epoxy groups of the component (C) in the presence of the catalyst (E), the said copolymer (A) having also been subjected, in the presence of the photoinitiator or of the photoinitiating system (D), to crosslinking by a radical route with itself and/or with the diluent (B) if the latter is reactive.

In the case where no heating stage preceding the irradiation stage is envisaged, a crosslinked composition is obtained in which, throughout the irradiated parts, the copolymer (A) has been subjected predominantly, in the presence of the photoinitiator or of the photoinitiating system (D), to crosslinking by a radical route with itself and/or with the diluent (B) if the latter is reactive and, in the shadow regions, the copolymer (A) has been predominantly subjected, in the presence of the catalyst (E), to crosslinking by reaction of its carboxylic acid groups with the epoxy groups of the component (C). The network is here also a single network, since the copolymer (A) has not been dissociated either.

It can be seen therefore that the crosslinking is complete in all cases, with the result that it can be said that the invention makes it possible in particular to solve the problem of the formation of protective and/or decorative coatings on substrates exhibiting shadow regions, with the additional advantage that it is possible not to heat the substrate. It is therefore not necessary to have an oven available for heating the coated substrate, and this may be an advantage from the viewpoint of economics. A network will be obtained which will not be of the same type, depending on whether the covered region is a shadow region or not (e.g. bottom of the pores in wood), but it is nevertheless possible to be certain that the crosslinking will take place everywhere, without any risk of subsequent exudation of monomers in the case of porous wood.

Bearing in mind the substrates referred to above, the process according to the invention will advantageously find applications in the motor vehicle industry, for protective coating of components under the bonnet, and in the furniture and interior decoration industry, and in the field of floor coverings.

The examples below are provided by way of illustration and without limiting the present invention. In these examples the parts and percentages are given by weight. The parts are given for a total of 100 parts and the percentages relate to these 100 parts. The compounds of the "SR" series used in these examples are marketed by Cray Valley, and those of the "Sarbox" series by Sartomer.

EXAMPLE 1

A crosslinkable composition is prepared by mixing:
58.8 parts of a polyglycol diepoxide resin marketed by Dow Chemical under the reference "DER 732";
41.2 parts of a styrene-maleic anhydride resin modified by partial esterification with hydroxyethyl methacrylate;
  27.5% of polyethylene glycol diacrylate diluent (Mw=400), the abovementioned styrene-maleic anhydride resin being marketed as a mixture with the diluent under reference Sarbox® SB-500K60;
  1.6% of tri(dimethylaminomethyl)phenol marketed by Cray Valley Ltd under the reference Synolide® 968; and
  3.3% of 2-benzyl-2-dimethylamino-1-(4-morpholinophenyl)-1-butanone marketed by Ciba-Geigy under the reference Irgacure® 369.

The crosslinkable composition thus obtained is then applied to the following substrates: untreated steel, rubber, etc. by means of a gun, in the form of a coating approximately 25 µm in thickness, and is then subjected to a stage of crosslinking at 100° C. for 2 minutes and, finally, to a stage of irradiation with ultraviolet radiation by means of a mercury lamp, at a speed of 4 m/min and under a lamp power of 120 watt/cm.

The adhesion of the crosslinked coating thus obtained to all the substrates used in the experiments is excellent.

EXAMPLE 2

A crosslinkable composition is prepared by mixing:
37.5 parts of 3,4-epoxycyclohexylmethyl-3',4'-epoxycyclohexane marketed by Union Carbide under the reference "UVR 6110";
62.5 parts of a styrene-maleic anhydride resin modified by partial esterification with hydroxyethyl methacrylate;
  72% of a diluent made up of:
    9.4% of triacrylate acidic adhesion promoter marketed under the reference "SR 9051"; and
    62.6% of ethoxylated trimethylolpropane triacrylate marketed under the reference "SR 454", the abovementioned modified styrene-maleic anhydride resin being marketed as a mixture with the diluent "SR454" under the reference Sarbox® SB-500E50;
  6.2% of benzyltrimethylammonium chloride;
  9% of 2-hydroxy-2-methyl-1-phenyl-1-propanone marketed by Ciba-Geigy under the reference "Darocur D1173".

The COOH/epoxy ratio is 0.5.

The above composition is applied onto a glass substrate, by means of a roll, in the form of a coating of 36 µm thickness, and then subjected to a stage of crosslinking at 100° C. for 10 minutes and, finally, to a stage of irradiation with ultraviolet radiation by means of a mercury lamp. The coating obtained was hard on leaving the machine.

The same composition was applied, by means of a roll, onto a wood substrate in which a succession of cavities of increasing depth, ranging up to 4 mm, had been made. The coating formed, filling the cavities, had a thickness of 36 µm on the surface of the substrate. The latter was subjected to a stage of crosslinking at 100° C. for 10 minutes and then to a stage of irradiation with ultraviolet radiation by means of a mercury lamp, at a speed of 8 m/min and under a lamp power of 120 watt/cm. The coating obtained had a hard surface when it came out and was polymerized to a depth of 4 mm.

The same composition was applied in the same conditions, subjected to an irradiation stage (8 m/min-120 watt/cm) and was then left at ambient temperature for a few days. The coating obtained has a hard surface and is polymerized to a depth of 4 mm.

EXAMPLE 3

A crosslinkable composition is prepared by mixing:

50 parts of bisphenol A diglycidyl ether marketed by Dow Chemical under the reference "DER 331";

50 parts of a styrene-maleic anhydride resin modified by partial esterification with hydroxyethyl methacrylate;

72.6% of a diluent made up of:
- 7.6% of triacrylate acidic adhesion promoter marketed by Cray Valley under the reference "SR 9051";
- 15% of 1,6-hexanediol diacrylate marketed under the reference "SR 238"; and
- 50% of ethoxylated trimethylolpropane triacrylate reactive diluent marketed under the reference "SR454", the abovementioned modified styrene-maleic anhydride resin being marketed as a mixture with the diluent "SR454" under the reference "Sarbox® SB-500E50".

5% of benzyltrimethylammonium chloride;

7.6% of 2-hydroxy-2-methyl-1-phenyl-1-propanone marketed by Ciba-Geigy under the reference "Darocur D1173".

The COOH/epoxy ratio is 0.5.

When applied in the same conditions as in Example 2, this crosslinkable composition gave the same results.

We claim:

1. Crosslinkable compositions suitable for use as a radiation curable coating for substrates with regions inaccessible to irradiation comprising:

(A) a modified copolymer which is a partial ester of a styrene-carboxylic anhydride copolymer and a hydroxyalkyl (meth) acrylate having carboxylic acid functional groups capable or reacting with epoxy functional groups in the presence of a catalyst of the reaction between epoxy groups and carboxyl groups;

(B) at least one diluent for the said modified copolymer;

(C) at least one multifunctional epoxide having epoxy functional groups capable of reacting with said carboxylic acid functional groups in the presence of a catalyst of the reaction between epoxy groups and carboxyl groups;

(D) at least one photoinitiator or photointiating system capable of initiating photopolymerization and (E) at least one catalyst of the reaction between said carboxylic acid functional groups and epoxy functional groups, said catalyst present in a proportion of 1 to 10% by weight, relative to the sum of components (A) and (C).

2. Crosslinkable composition according to claim 1, characterized in that said styrene-carboxylic anhydride copolymer has a number-average molecular weight of between 500 and 4000 and a molar ratio of styrene to carboxylic anhydride of between 1 and 4.

3. Crosslinkable composition according to claim 1, further including a monovalent alcohol for modifying the styrene-carboxylic anhydride copolymer chosen from aliphatic alcohols whose chain has from 1 to 22 carbon atoms.

4. Crosslinkable composition according to claim 1, characterized in that the multifunctional epoxide (C) is chosen from cycloaliphatic, aliphatic and aromatic diepoxidized resins, aliphatic triepoxidized resins and tetraepoxidized resins, and multi-epoxidized resins.

5. Crosslinkable composition according to claim 1, characterized in that the molar ratio of the hydroxyalkyl (meth) acrylate to the carboxylic anhydride functional groups present in the styrene-carboxylic anhydride copolymer does not exceed 1.

6. Crosslinkable composition according to claim 1, characterized in that the molar ratio of the carboxylic acid functional groups of the partially esterified copolymer to the epoxy functional groups of the multifunctional epoxide is between 0.3 and 2.

7. Crosslinkable composition according to claim 1 characterized in that the proportion of diluent is between 5% and 200% by weight of the sum of the components (A)+(C).

8. Crosslinkable composition according to claim 1 characterized in that the at least one photoinitiator or photoinitiating system capable of initiating photopolymerization is present in a proportion of 2 to 15% of the weight of the sum of the components (A)+(C).

9. Crosslinkable composition according to claim 1, characterized in that the catalyst (E) of the reaction between the carboxylic acid functional groups of the modified copolymer (A) and the epoxy functional groups of the multifunctional epoxide (C) is selected from the group consisting of tertiary amines, betaines, organic onium acetates, triphenylphosphite chromium acetate and quaternary salts of tertiary amines.

10. Crosslinkable composition according to claim 1, characterized in that it additionally includes at least one additive chosen from inorganic or organic pigments, polymer waxes and pulverulent inorganic fillers.

11. Process for coating substrates, characterized in that it consists in applying onto a substrate a layer of a crosslinkable composition as defined in claim 1; reacting said carboxylic acid functional groups with said epoxy groups; and crosslinking said composition by irradiation.

12. Process for coating substrates according to claim 11, including the thermal crosslinking stage which is performed at a temperature of 80° to 150° C. for a period of 15 seconds to 10 minutes.

13. Process according to claim 12, characterized in that the thermal crosslinking stage is performed at a temperature of 90 to 120° C.

14. Substrate with regions inaccessible to irradiation comprising a coating obtained by crosslinking a composition as defined in claim 1, with crosslinking taking place everywhere.

15. Coated substrate according to claim 14, characterized in that the network is homogeneous over the whole coating, the crosslinkable composition having been subjected to a stage of heating followed by the irradiation stage.

16. Coated substrate comprising shadow regions or regions, inaccessible to the irradiation, according to claim 14, characterized in that the coating is made up of a crosslinked composition in which, throughout the irradiated parts, the copolymer (A) has been subjected, in the presence of the photoinitiator or of the photoinitiating system (D), to crosslinking by a radical route with itself and/or with the diluent (B) if the latter is reactive, and crosslinking by carboxylic acid-epoxide reaction and, in the shadow regions, the copolymer (A) has been predominantly subjected, in the presence of the catalyst (E), to crosslinking by reaction of its carboxylic acid groups with the epoxy groups of the component (C), the crosslinkable composition having been subjected only to an irradiation stage.

17. Coated substrate according to claim 14, characterized in that it consists of a substrate which has a surface with shadow regions.

18. Coated substrate according to claim 14, wherein said coating in the crosslinked state includes a network formed by the partially esterified styrene-carboxylic anhydride copolymer (A) which, in the network, has been maintained without dissociation of its hydroxyalkyl (meth) acrylate groups and has had its carboxylic acid groups which have reacted with the epoxy groups of the component (C) in the presence of the catalyst (E), the said copolymer (A) having also been subjected in the presence of the photoinitiator or of the photoinitiating system (D) to crosslinking by a radical route with itself and/or with the diluent (B) if the latter is reactive, the epoxy groups of the component (C) having been totally or substantially totally consumed by reaction with the carboxylic acid groups of the component (A).

19. Process according to claim 11, where the crosslinkable composition is only subjected to irradiation, with crosslinking taking place everywhere on the coated substrate.

20. Coated substrate prepared by the process of claim 19.

* * * * *